(12) United States Patent
Batista

(10) Patent No.: US 9,420,763 B2
(45) Date of Patent: Aug. 23, 2016

(54) FASHION DOG HARNESS

(71) Applicant: Julia Batista, Bloomfield, NJ (US)

(72) Inventor: Julia Batista, Bloomfield, NJ (US)

(*) Notice: Subject to any disclaimer, the term of this patent is extended or adjusted under 35 U.S.C. 154(b) by 124 days.

(21) Appl. No.: 14/231,982

(22) Filed: Apr. 1, 2014

(65) Prior Publication Data

US 2014/0299073 A1  Oct. 9, 2014

Related U.S. Application Data

(60) Provisional application No. 61/809,133, filed on Apr. 5, 2013.

(51) Int. Cl.
*A01K 13/00* (2006.01)
*A01K 27/00* (2006.01)

(52) U.S. Cl.
CPC ........... *A01K 27/002* (2013.01); *A01K 27/008* (2013.01)

(58) Field of Classification Search
CPC .................... A01K 27/002; A01K 27/008
USPC ............. 54/18.1, 18.2, 18.3, 79.1, 79.4, 30, 54/19.1, 20; 119/850, 856, 863, 864, 865; D30/145, 152
See application file for complete search history.

(56) References Cited

U.S. PATENT DOCUMENTS

| | | | | |
|---|---|---|---|---|
| 4,581,877 A | * | 4/1986 | Wilber | A61D 9/00 128/858 |
| 4,756,145 A | * | 7/1988 | Pelling | A01K 13/006 119/850 |
| 5,329,885 A | | 7/1994 | Sporn | |
| 6,443,101 B1 | * | 9/2002 | Fazio | A01K 27/002 119/792 |
| 7,370,608 B1 | | 5/2008 | Friedman | |
| 8,210,131 B2 | * | 7/2012 | Friedland | A01K 13/006 119/792 |
| D701,356 S | | 3/2014 | Troll | |
| 2005/0217609 A1 | * | 10/2005 | Dorton | A01K 13/006 119/792 |
| 2008/0115738 A1 | * | 5/2008 | Cherrett | A01K 13/008 119/850 |
| 2009/0120377 A1 | | 5/2009 | Palmer | |

* cited by examiner

*Primary Examiner* — Kristen C Hayes
*Assistant Examiner* — Ebony Evans
(74) *Attorney, Agent, or Firm* — The Gray Law Group, Ltd; Robert Gray

(57) ABSTRACT

A fashion dog harness manufactured from fabric material is made by cutting a section of fabric that is long enough to accommodate the belly circumference of a target dog size group, plus some overlap. A preferred embodiment using a facsimile of the waistband areas of jeans or trousers is contemplated. A neck hole is cut in a bell-shape to accommodate the dog's neck. A set of hook and loop closure patches is sewn or otherwise affixed to the outer ends of the piece, and a metal D-ring is attached at the top center of the harness, by linking it to a strip of polypropylene webbing concealed longitudinally within the harness. The harness is used by slipping the dog's head through the neck hole, fastening the hook and loop closure under the belly, and attaching a leash to the metal D-ring.

18 Claims, 1 Drawing Sheet

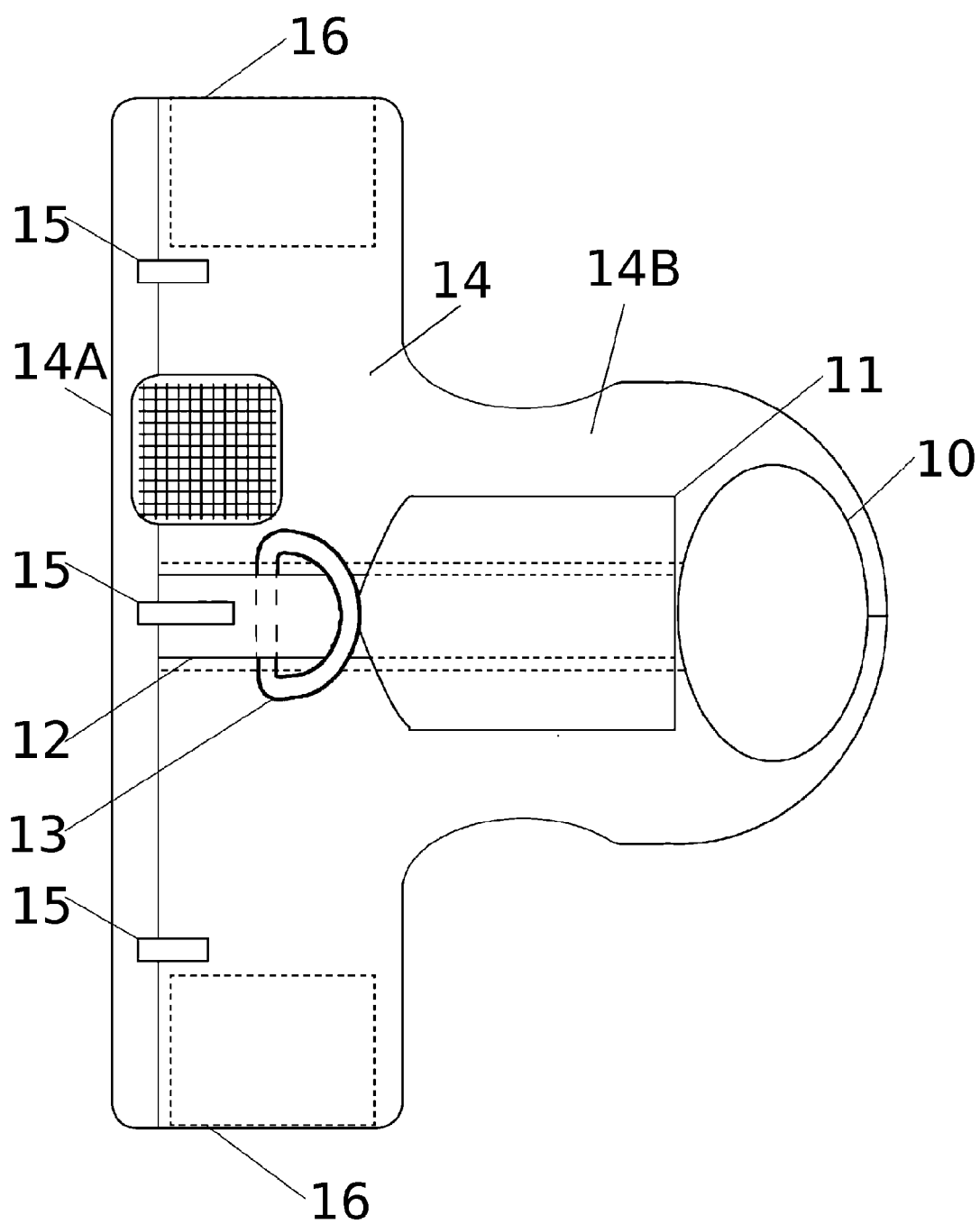

FASHION DOG HARNESS

CROSS-REFERENCE TO RELATED APPLICATIONS

Not Applicable

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to dog harnesses, and in particular to a dog harness manufactured from fabric material. Dog owners often seek to express their affection for their pets and their individuality by purchasing unique collars, leashes, harnesses and other accessories for their pets. Fashionable accessories of this nature can also be vulnerable to breakage when walking the dog; the consequences of such breakage, when a dog is lost or bites another person, can be very substantial for the dog's owner. A dog harness that is manufactured from sturdy fabric, such as blue denim reinforced with polypropylene webbing, would allow the owner to express their fashion preferences while providing sufficient strength to substantially reduce the risk of breakage and provide a comfortable harness for the dog user.

SUMMARY OF THE INVENTION

Accordingly, the invention is directed to a fashion dog harness manufactured from fabric material. The harness is made by cutting a section of fabric that is long enough to accommodate the belly circumference of a target dog size group, plus some overlap. A preferred embodiment using a facsimile of the waistband areas of jeans or trousers is contemplated. A neck hole is cut in a bell-shape to accommodate the dog's neck. A set of hook and loop closure patches is sewn or otherwise affixed to the outer ends of the piece, and a metal D-ring is attached at the top center of the harness, by linking it to a strip of polypropylene webbing concealed longitudinally within the harness. The harness is used by slipping the dog's head through the neck hole, fastening the hook and loop closure under the belly, and attaching a leash to the metal D-ring.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

FIG. 1 shows the top view of the first exemplary embodiment displaying the neck hole 10, the pocket 11, the webbing 12, the metal D-ring 13, the fabric piece 14, the waistband 14A, the bell-shaped portion 14B, the belt loops 15, and the hook and loop closure patches 16.

DETAILED DESCRIPTION OF THE INVENTION

Referring now to the invention in more detail, the invention is directed to a fashion dog harness manufactured from fabric material reinforced by a strip of polypropylene webbing. The harness is made by cutting a section of fabric 14 (or a plurality of congruent layers) that is long enough to accommodate the belly circumference of a target dog size group, plus some overlap. The fabric piece 14 is cut to a width to fit within the torso length of the target dog size group, and a bell-shaped portion sufficient in size to reach over the neck of the target dog size group.

A preferred embodiment using a facsimile of the waistband areas of jeans or trousers is contemplated. A neck hole is cut in a bell-shape to accommodate the dog's neck. In this first exemplary embodiment of the device, a pair of denim trousers is imitated, by folding over a section of about rectangular fabric 14 to form a waistband 14A. The fabric 14 is centered about a facsimile of a pocket 11; the fabric 14 is long enough to accommodate the belly circumference of a target dog size group, plus some overlap. The denim is preferably layered on top of one or more additional congruent pieces of fabric (of woven cotton or other common material); this enhances the tensile strength of the piece. The fabric 14 is cut to a width to fit within the torso length of the target dog size group, and a bell-shaped portion 14B is included around the pocket facsimile 11 to a sufficient size to reach over the neck of the target dog size group. A second exemplary embodiment that does not include a pocket 11 is contemplated and may be made of any durable fabric material such as cotton, canvas, or sheepskin, also preferably having multiple layers.

In all contemplated embodiments, a neck hole 10 is cut in the bell-shaped portion to accommodate the dog's neck. The neck hole 10 may be inseparable and surrounded by a single piece of materials, or the neck hole 10 may be separable and fastenable via a closure such as hook and loop fabric, buttons, or snaps. A set of hook and loop closure patches 16 is sewn or otherwise affixed to the outer ends of the piece, and a metal D-ring 13 is attached at the top center of the harness, by linking it to a strip of polypropylene webbing 12, which is concealed within or beneath, and is affixed, by reinforced stitching or other fastener, to the fabric piece 14. Embodiments sized for larger or more powerful breeds may include an additional closure mechanism such as a metal spring clip linked via chain or strap the fabric piece 14. The harness is used by slipping the dog's head through the neck hole 10, fastening the hook and loop closure patches 16 under the belly, and attaching a leash to the metal D-ring 13.

In the first exemplary embodiment, blue denim fabric, three decorative belt loops 15, and yellow thread would preferably be used in the manufacture of the harness, including the pocket 11, to closely replicate the appearance of blue jeans. More or fewer belt loops 15 are contemplated. The pocket 11 would preferably be shaped in the five-sided design of a rear pocket on a typical pair of blue jeans. The pocket 11 would also preferably be affixed using decorative rivets in addition to stitching or other fastening means.

In all contemplated embodiments, a strong, broad strip of webbing 12, preferably manufactured from polypropylene, nylon, or another strong, flexible fiber, would extend from the neck hole 10 to the waistband 14, under the pocket 11, concealed within or beneath the fabric piece 14, to provide additional structural strength. The metal D-ring 13 would preferably be manufactured from a durable, rigid metal with substantial shear strength, such as steel.

Component sizes and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A fashion dog harness comprising:
   (a) a fabric piece;
   (b) said fabric piece being about rectangular and having a bell-shaped portion opposite a long straight edge;
   (c) a neck hole;
   (d) said neck hole being an open space within said bell-shaped portion;
   (e) a waistband;
   (f) said waistband being formed by folding over the long straight edge of said fabric piece that is opposite said bell-shaped portion;
   (g) a plurality of belt loops,
   (h) said belt loops being affixed to said fabric piece over said waistband;
   (i) a pair of complementary hook and loop fabric patches;
   (j) said pair of complementary hook and loop fabric patches being affixed to opposite ends of said fabric piece;
   (k) a webbing strip;
   (l) said webbing strip being concealed within or beneath said fabric piece;
   (m) said webbing strip being positioned such that a longitudinal axis of the webbing strip is perpendicular to said waistband and cocentered with said neck hole;
   (o) a D-ring;
   (p) said D-ring being linked to said webbing strip;
   (q) said fabric piece being of a width to fit an approximate torso length of a target dog size group; and
   (r) said fabric piece being of a length sufficient to wrap around the belly circumference of said target dog size group.

2. The fashion dog harness of claim 1 wherein said fabric piece comprises multiple congruent layers of fabric.

3. The fashion dog harness of claim 2 wherein an outermost layer of said fabric piece is denim.

4. The fashion dog harness of claim 2 further comprising a facsimile pocket, said facsimile pocket being affixed to the exterior of said fabric piece.

5. The fashion dog harness of claim 4 further comprising any of the group of blue fabric, decorative rivets, yellow stitching, or said plurality of belt loops being three in number; whereby the appearance of said fashion dog harness more closely resembles human blue jeans.

6. The fashion dog harness of claim 2 further comprising a facsimile pocket, said facsimile pocket being affixed to the exterior of said fabric piece.

7. The fashion dog harness of claim 6 further comprising any of the group of blue fabric, decorative rivets, yellow stitching, or said plurality of belt loops being three in number; whereby the appearance of said fashion dog harness more closely resembles human blue jeans.

8. The fashion dog harness of claim 3 further comprising a facsimile pocket, said facsimile pocket being affixed to the exterior of said fabric piece.

9. The fashion dog harness of claim 8 further comprising any of the group of blue fabric, decorative rivets, yellow stitching, or said plurality of belt loops being three in number; whereby the appearance of said fashion dog harness more closely resembles human blue jeans.

10. The fashion dog harness of claim 2 further comprising any of the group of blue fabric, decorative rivets, yellow stitching, or said plurality of belt loops being three in number; whereby the appearance of said fashion dog harness more closely resembles human blue jeans.

11. The fashion dog harness of claim 3 further comprising any of the group of blue fabric, decorative rivets, yellow stitching, or said plurality of belt loops being three in number; whereby the appearance of said fashion dog harness more closely resembles human blue jeans.

12. The fashion dog harness of claim 1 wherein said fabric piece is denim.

13. The fashion dog harness of claim 4 further comprising a facsimile pocket, said facsimile pocket being affixed to the exterior of said fabric piece.

14. The fashion dog harness of claim 13 further comprising any of the group of blue fabric, decorative rivets, yellow stitching, or said plurality of belt loops being three in number; whereby the appearance of said fashion dog harness more closely resembles human blue jeans.

15. The fashion dog harness of claim 12 further comprising any of the group of blue fabric, decorative rivets, yellow stitching, or said plurality of belt loops being three in number; whereby the appearance of said fashion dog harness more closely resembles human blue jeans.

16. The fashion dog harness of claim 1 further comprising a facsimile pocket, said facsimile pocket being affixed to the exterior of said fabric piece.

17. The fashion dog harness of claim 16 further comprising any of the group of blue fabric, decorative rivets, yellow stitching, or said plurality of belt loops being three in number; whereby the appearance of said fashion dog harness more closely resembles human blue jeans.

18. The fashion dog harness of claim 1 further comprising any of the group of blue fabric, decorative rivets, yellow stitching, or said plurality of belt loops being three in number; whereby the appearance of said fashion dog harness more closely resembles human blue jeans.

* * * * *